United States Patent [19]
Faroudja et al.

[11] Patent Number: 4,672,429
[45] Date of Patent: Jun. 9, 1987

[54] WIDE BANDWIDTH CHROMINANCE NOISE REDUCTION SYSTEM

[75] Inventors: Yves C. Faroudja, Los Altos Hills; Jack J. Campbell, San Francisco, both of Calif.

[73] Assignee: Faroudja Laboratories, Inc., Sunnyvale, Calif.

[21] Appl. No.: 701,384

[22] Filed: Feb. 14, 1985

[51] Int. Cl.⁴ ............................................. H04N 9/64
[52] U.S. Cl. ..................................................... 358/36
[58] Field of Search ........:................................ 358/36

[56] References Cited

U.S. PATENT DOCUMENTS

| | | | |
|---|---|---|---|
| 4,242,704 | 12/1980 | Ito | 358/36 |
| 4,268,855 | 5/1981 | Takahashi | 358/36 |
| 4,291,333 | 9/1981 | Warnock | 358/36 |
| 4,305,091 | 12/1981 | Cooper | 358/36 |
| 4,568,969 | 2/1986 | Kanemoto | 358/36 |
| 4,573,070 | 2/1986 | Cooper | 358/36 |

Primary Examiner—Michael A. Masinick
Attorney, Agent, or Firm—David B. Harrison

[57] ABSTRACT

Apparatus and method for chroma noise reduction in a quadrature modulated color television signal path carries out the steps of detecting a chroma signal noise component in the path; detecting predetermined signal characteristics in the path; generating a control signal as a function of the detected signal characteristics wherein the signal characteristics include at least one of: luminance component amplitude, luminance component level transition, and a combination of simultaneously occurring conditions in luminance and chrominance signal components in the path; applying the control signal to separate chroma signal component noise from the predetermined signal characteristics; and subtracting the separated chroma noise in time coincidence with the color television signal in the path, whereby chroma noise is reduced from the signal path without bandwidth reduction.

21 Claims, 2 Drawing Figures

WIDE BANDWIDTH CHROMINANCE NOISE REDUCTION SYSTEM

BACKGROUND OF THE INVENTION

The present invention relates to color television signal processing systems. More particularly, the present invention relates to methods and apparatus for horizontal domain chrominance noise reduction without significant bandwidth losses.

REFERENCE TO RELATED PATENTS

The following patents provide useful background information relating to the present invention;

U.S. Pat. No. 4,030,121 for Video Crispener, Yves C. Faroudja, inventor.

U.S. Pat. No. 4,240,105 for Method and Apparatus for Separation of Chrominance and Luminance with Adaptive Comb Filter in Quadrature Modulated Colar Television System, Yves C. Faroudja, inventor.

U.S. Pat. No. 4,443,817 for Chroma Noise Reduction System for Quadrature Modulated Color Television Picture Signals, Yves C. Faroudja, inventor.

U.S. patent application Ser. No. 06/349,017, filed on Feb. 16, 1982, now U.S. Pat. No. 4,504,853, for Enhancement of Quadrature Modulated Chroma by Luminance or Chroma Transitions Without Chroma Demodulation, Yves C. Faroudja, inventor.

U.S. patent application Ser. No. 06/701,385, filed on Feb. 14, 1985, for Inter-Dimensional Chrominance Noise Reduction System, Yves C. Faroudja and Jack J. Campbell, co-inventors, the disclosure of which is incorporated herein by reference.

It is known to employ enhancement and noise reduction techniques to reduce noise in the chrominance component of a quadrature modulated color television picture signal. One prior chroma noise recu tion approach is described in the referenced U.S. Pat. No. 4,443,817. Chroma enhancement methods and apparatus are set forth in the refereneced U.S. Pat. No. 4,030,121 and in U.S. Pat. No. 4,504,853.

In prior chroma enhancement and noise reduction approaches, certain picture artifacts resulted from the noise reduction process which in certain circumstances yielded less than desirable picture quality. The reduced picture quality stemmed from the inability of the prior methods and systems to preserve the original picture signal bandwidth.

Another heretofore unsolved problem arose through the unintended operation of the noise reduction system and resultant generation of unwanted, objectional picture artifacts in response to certain dynamic picture conditions, not instances of chroma noise.

SUMMARY OF THE INVENTION WITH OBJECTS

One general object of the present invention is to provide a wide bandwidth chrominance noise reduction system and method free of bandwidth losses and which is interposed only in the event of the instance of noise, thereby overcoming the limitations and drawbacks of prior art chroma noise reduction systems.

Another object of the present invention is to provide a chroma noise reduction system which is responsive only in the presence of chrominance in the picture signal.

A further object of the present invention is to provide a chroma noise reduction system which is effectively controlled by a logic system responsive to various picture conditions, so that in preselected ones of picture conditions the chroma noise reduction system will not operate upon the signal path and in preselected others of picture conditions the chroma noise reduction system will operate, fully or proportionally to the preselected condition.

One more object of the present invention is to provide an automatically variable control system for chroma noise reduction which detects the presence of a chroma transition and reduces chroma noise reduction processing to zero value during the detected transition, so that no unwanted noise reduction artifacts are generated by a chroma transition in the picture content.

Another object of the present invention is to provide a control system which provides for chroma noise reduction in relation to the chroma level present in the chrominance passband.

One more object of the present invention is to provide a control system which inhibits chroma noise reduction during instances of luminance transitions so as not to interfere with fine picture details.

A still further object of the present invention is to provide a control system which detects overall picture levels and overrides other chroma noise reduction control inhibitors when the overall picture amplitude level (gray scale) is below a predetermined threshold, unless a luminance transition is determined to be present.

Yet another object of the present invention is to provide a vastly improved wide band chrominance noise reduction system which is virtually free of bandwidth losses and which is automatic, which is effective to reduce perceptible chrominance noise to a level at or below the minimum level of visual perception, which is easily fabricated with existing circuit elements at low prime cost, and which is reliable and maintenance free during extended periods of operation.

These objects are achieved in a chroma noise reduction system and methods which are virtually free of bandwidth losses and reduction.

One exemplary system for implementing the methods of the present invention includes an input for receiving a quadrature modulated color television picture signal. The input passes the video in four parallel paths, a first path which includes a chrominance bandpass filter, a second path which includes a chrominance enhancement and noise reduction system, a third main signal path which includes a delay line for time delay matching purposes, and a fourth path which includes a control logic signal generator.

The signals put out from the band pass filter and the noise reduction and enhancement system are combined in a difference circuit which puts out a difference value when the signal (noise reduction artifacts) generated by the chrominance noise reduction and enhancement system differs from the chroma band pass signal put out by the bandpass filter. This difference value is generally small and essentially is composed of chroma noise and picture transition artifacts.

The difference value is limited to a predetermined value and this value is then multiplied in a four quadrant multiplier with a fractional value logic control pulse put out by the control logic generator in order to eliminate picture transition artifacts while preserving chroma noise components. The resultant product, is a noise reduction error signal having a value lying in a range between zero and the predetermined value, in accordance with the fractional value of the logic control pulse which closely approximates choma noise components and excludes picture artifacts generated by chroma or luminance transitions. This product is then subtracted from the time delayed third main signal path in a second subtractor circuit. The difference is then put out as a color signal which has undergone wide band chroma noise reduction.

The control logic generator comprises a sub-system which is responsive to various picture conditions, so that in preselected ones of picture conditions the chroma noise reduction system will not operate upon the signal path and in preselected others of picture conditions the chroma noise reduction system will operate, fully or proportionally to the preselected condition.

In one aspect, the method of the present invention controls operation of a chrominance noise reduction system in a color television picture signal path by: detecting picture conditions in the signal path, generating a control signal in relation to the detected picture conditions, and applying the control signal to control operation of the noise reduction system.

In another aspect, the method of the present invention comprises the further steps of: detecting luminance level in the path, and overriding the control signal when detected luminance level is below a predetermined value.

In a further aspect, the method of the present invention includes the further steps of: detecting luminance transitions in the path, and inhibiting the overriding step during detected luminance transition intervals.

In yet another aspect, the method of the present invention controls operation of a chrominance noise reduction system in a color television picture signal path by: detecting chroma levels in the signal path, generating a control signal in relation to detected chroma levels, and applying the control signal to control operation of the noise reduction system.

In a still further aspect, the method of the present invention controls operation of a chrominance noise reduction system in a color television picture signal path by: detecting chroma transitions in the path, generating a control signal in relation to detected chroma transitions, and applying the control signal to control the chrominance noise reduction system in order to reduce operation of thereof during detected chroma transition intervals.

In one more aspect, the method of the present invention controls operation of a chrominance noise reduction system in a color television picture signal path by: detecting luminance transitions in the path, generating a control signal in relation to detected luminance transitions, and applying the control signal to control the chrominance noise reduction system in order to reduce operation thereof during detected luminance transition intervals.

In a still further aspect, the method of the present invention achieves chroma noise reduction in a quadrature modulated color television signal path, and the method includes steps of:
  detecting chroma noise in the path,
  detecting picture conditions in the path to generate a control signal in relation to the conditions,
  applying the control signal to separate chroma noise from picture conditions,
  subtracting the separated chroma noise in time coincidence with the color television signal in the path, whereby chroma noise is reduced from the signal path without chroma bandwidth reduction.

In still one other aspect, the method of the present invention includes the steps of:
  band pass filtering a quadrature modulated color television picture signal to put out a chrominance pass band component thereof,
  generating an enhanced color television picture signal from said modulated picture signal with chroma noise reduction means to put out enhanced chroma with reduced noise but with no increase in chroma transition rise times,
  comparing the enhanced and noise-reduced chroma with said chrominance pass band component to detect and put out any differences therein,
  amplitude limiting said difference to a predetermined unitary error value,
  generating a logic value with a logic system responsive to various picture conditions, so that in preselected ones of picture conditions the generated logic value will inhibit chroma noise reduction and unwanted artifacts and in preselected others of picture conditions the generated logic value will enable chroma noise reduction fully or proportionally to the preselected condition,
  multiplying said unitary error value by said logic value to produce an error signal having a value between zero and unity,
  subtracting said error signal in proper time from the color television picture signal thereby achieving a wide bandwidth chroma noise reduction therein.

The method followed by the control logic generator is a further and independent aspect of the present invention.

The foregoing and other objects, advantages and features of the present invention will be further appreciated by consideration of the following detailed description of a preferred embodiment, presented with the accompanying drawings.

DETAILED DESCRIPTION OF A PREFERRED EMBODIMENT

Figure 1:
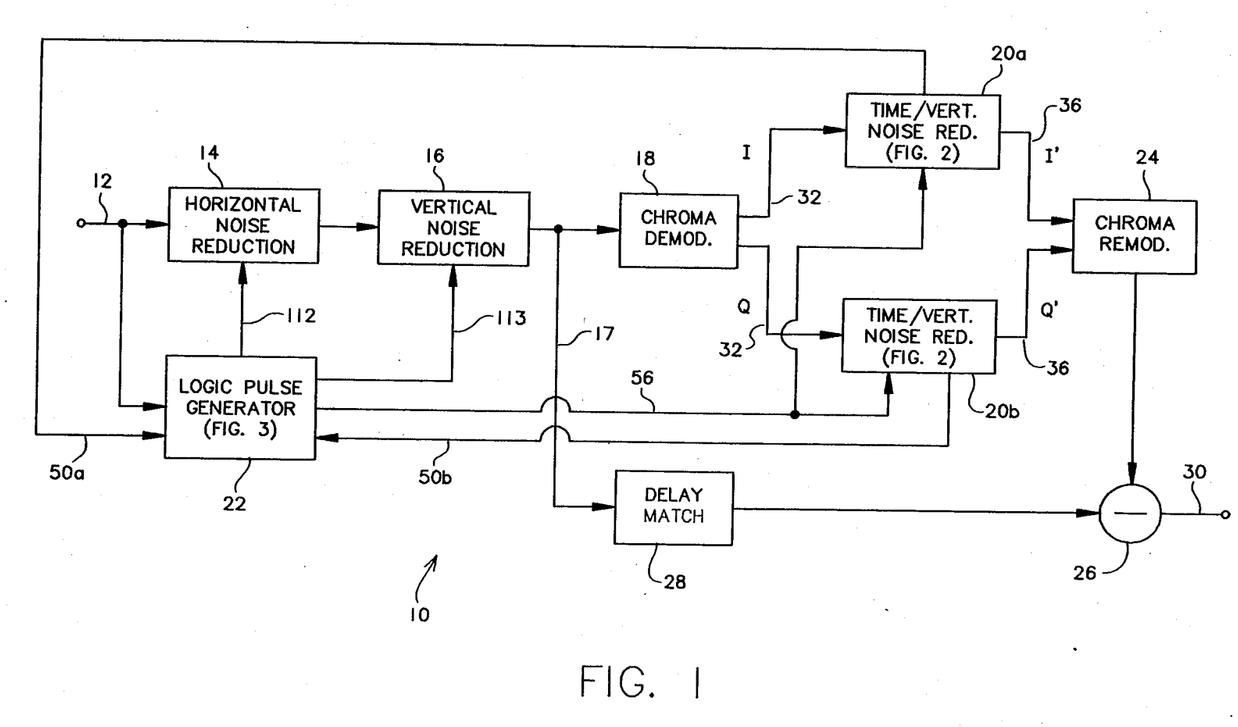
FIG. 1 is a block diagram of a wide bandwidth chroma noise reduction system operating in the horizontal domain in accordance with the principles of the present invention.

A chroma noise reduction system 10 which is virtually free of bandwidth losses is depicted in the overall system block diagram of FIG. 1. The system 10 operates in the horizontal domain. The system includes an input node 12 which accepts a quadrature modulated color television picture signal, either in the NTSC or PAL format.

A band pass filter 14 having a characteristic to pass the chrominance subcarrier components is connected to the input node 12 and passes picture signal components lying in the region of the chrominance passband, (e.g. in a plus or minus 1.5 Megahertz bandwidth centered around the chroma subcarrier frequency). A high pass filter may also be employed as the filter 14 with little degradation in performance.

A chroma enhancement system 16 which has a very narrow chrominance pass band characteristic and refuses to pass noise components through its processing channels is also connected to the input 12 to receive the composite color video signal. The enhancer 16 functions to crispen chrominance transitions in a manner which yields a resultant signal having the same apparent chrominance bandwidth as the unprocessed video. This sub-system may be any device or method for eliminating noise components and compensating for the related chrominance bandwidth losses by enhancement and thereby providing an apparent bandwidth which is analogous to the bandwidth of the original composite color signal in which the chroma noise is present. One desired form of chroma enhancement apparatus and method is set forth in the referenced U.S. patent application Ser. No. 06/349,017, now U.S. Pat. No. 4,504,853, the disclosure of which is specifically incorporated herein by reference. Another satisfactory chroma enhancement system is set forth in the referenced U.S. Pat. No. 4,030,121, and specifically the embodiments described in connection with FIG. 9 thereof, disclosure of which patent is specifically incorporated by reference.

The noise reduced chroma output from the chroma enhancement sub-system 16 and the band pass filtered chroma from the band pass filter 14 are subtracted from each other in a difference circuit 18. Ordinarily, the outputs from the elements 14 and 16 are identical, and the values cancel each other in the difference circuit 18. Whenever chroma noise is encountered, the chroma noise component passes through the band pass filter 14 but is impeded and does not pass through the enhancement/noise reduction subsystem 16. The outputs from the band pass filter 14 and the enhancement sub-system 16 are subtracted from each other in a difference circuit 18.

If either output is different from the other output, the presence of a noise artifact is thereby determined, and this artifact is a difference value which is supplied to an amplifier limiter 20 which amplifies and puts out the difference value as a signal up to a maximum predetermined value. This predetermined maximum value represents a chroma noise error value having an amplitude of no more than the typical chroma noise amplitudes found in noisy television systems such as helical scan recording and playback systems. Usually this value is about 8 IRE units. Thus, the difference value, which may be any value up to the maximum, but no greater than the maximum predetermined value, is e.g. 8 IRE units. This value represents the maximum error value which may ultimately be subtracted from the main path composite color signal to achieve noise reduction.

For very large chroma transitions, the outputs of the filter 14 and enhancer/noise reducer 16 may be greater than e.g. 8 IRE units. The limiting amplifier 20 will in these conditions effectively reduce the amount of noise reduction during such very large chroma transitions in relation to the predetermined maximum value.

A horizontal logic sub-system 24 generates a linear logic pulse havng a fractional value between zero and unity. The logic pulse generated by the sub-system 24 is multiplied with the unitary error value in a four quadrant multiplier 22 e.g. of the type described in the referenced U.S. Pat. No. 4,030,121, and the resultant error product, which has a value lying between zero and the full predetermined value put out by the limiting amplifier 20 is applied to a second difference circuit 26.

The second difference circuit 26 lies in a main composite color signal path extending from the input node 12. A time delay circuit 28 is interposed in this main path between the input 12 and the second difference circuit 26 to provide a normalized delay to the unprocessed color signal which is equal to the delay imposed upon the chrominance components as they pass through the other circuit elements. In this way, the error product put out by the multiplier 22 is in time with the chroma noise present in the main path. When the error product has a value other than zero, the error product is subtracted in phase from the main path composite color signal in the second difference circuit, thereby cancelling out the chroma noise component otherwise present in the main path. The processed signal put out by the second difference circuit 26 at an output 30 is the original quadrature modulated color signal which has undergone a high bandwidth chroma noise reduction process in the horizontal domain.

Figure 2:
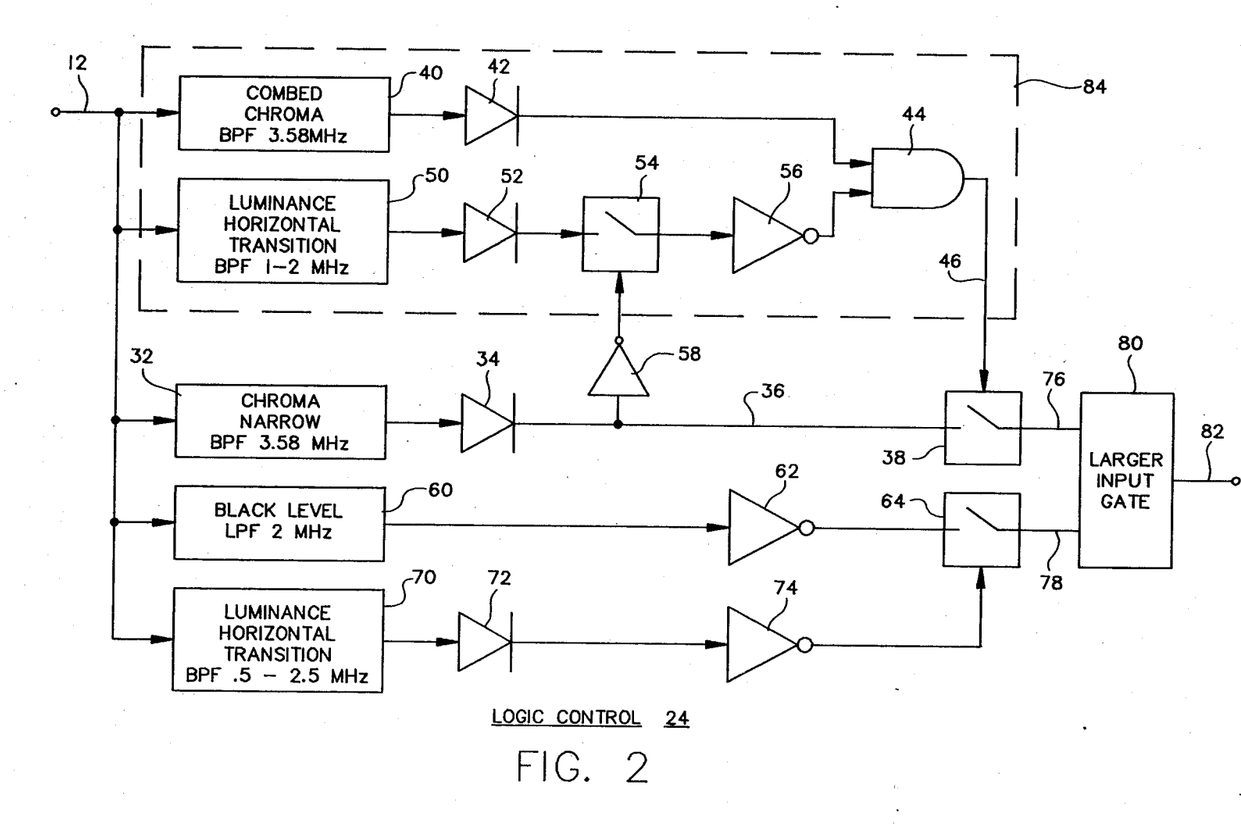
FIG. 2 is a more detailed block diagram of a logic sub-system control element of the system depicted in FIG. 1 which is responsive to various picture conditions, so that in preselected ones of picture conditions the chroma noise reduction sub-system element of FIG. 1 will not operate upon the signal path and in preselected others of picture conditions the chroma noise reduction system will operate, fully or proportionally to the preselected condition.

The horizontal logic control sub-system 24 is described in FIG. 2. Therein, the composite color picture signal from the input node 12 is shown to pass through five separate processing paths.

A first path through the sub-system 24, to determine chroma level, is through a chrominance band pass filter 32, having a sharply tuned pass band at the chrominance subcarrier frequency (3.58 MHz in NTSC format). A full wave rectifier 34 (depicted symbolically as a diode in FIG. 2) removes any sign associated with transition direction of the signal from the chroma band pass filter, and puts out a zero value when the absolute value of the chroma received from the band pass filter 32 is low, e.g. 10 IRE units or below. When the chroma level is between 10 and 25 IRE units, the rectifier 34 puts out a value between zero and a predetermined unitary value, which is smoothly and linearly proportional to the chroma level in this transition region between 10 and 25 IRE units. When the detected absolute value of chroma is above e.g. 25 IRE units, the rectifier puts out the unitary value. Thus, it is appreciated that the rectifier 34 includes a non-linear amplifier component which carries out the described non-linear process in putting out a value which is zero to 10 IRE units, linearly increasing between 10 and 25 IRE units and constant above 25 IRE units. This signal is present on a line 36 and enters an electronic switch 38.

The first path operates at the pixel rate. If, for example, a chroma transition occurs from zero amplitude to full amplitude and then returns to zero amplitude in terms of microseconds (line rate), then the signal put out on line 36 will be a transition which begins gently before the sharp chroma transition, and which falls off gently after the end of the sharp chroma transition. Thus, in this example, the signal on line 36 is a chroma transition window. The slope of the window signal on line 36 is more gentle than the chroma transition by a ratio of two or three.

When the picture signal contains an excessive amount of luminance information in the chrominance pass band without corresponding chroma information, chroma noise enhancement and reduction is inappropriate and leads to generation and insertion of unwanted picture artifacts. This situation is usually artificially generated, since it most unusual to find a picture pattern of vertical luminance fine lines in the chrominance pass band. However, artificially generated picture signals are becoming more widely generated as with computer techniques. Thus, every signal possibly included in the television picture spectrum should be accounted for in a wideband chroma processing system.

Also, during long periods in which the picture signal is essentially monochrome, the chroma noise reduction-/enhancement circuits are unnecessary and should be removed in order to eliminate undesired artifacts in response to luminance phenomena.

The switch 38 is closed by a signal which indicates that the overall value of combed chrominance is above a minimum amount, such as about 10 IRE units, and when luminance transition values, if present, are below another value, such as 10 IRE units. In the event that chroma levels are above a threshold of approximately 40 IRE units, then the switch 38 is closed, as the switch 54 is opened. Operation of the switch 54 is explained subsequently herein in connection with the third path through the logic sub-system 24.

Second and third paths through the logic sub-system 24, which are commonly related and are thus identified by the dashed line block 84 in FIG. 2, provide a control signal to operate the switch 38. The second path is through a chrominance comb filter 40 which puts out a signal indicating the chrominance level at the chrominance subcarrier. This value is full wave rectified and put out by a full wave rectifier 42 as a logical high control signal whenever the absolute value of chrominance in the picture signal is determined to be above a threshold level, such as 10 IRE units. This signal is supplied as one input to an AND logic gate 44, which generates a logic output on a line 46 for operating the switch 38.

The third path for the color composite signal through the sub-system 24 is through a luminance band pass filter 50 having a pass band comprising a high energy region of luminance, such as 1 to 2 megahertz of base band video. This filter 50 develops an output signal indicative of horizontal level transitions occurring in the base band. This output signal is full wave rectified by a rectifier 52 to become an absolute value and enters a fast electronic switch 54. The switch 54 is closed until the chrominance level reaches about 40 IRE units, and the switch opens completely over a narrow range of about 4 IRE units, so that the switching action is very fast, albeit smooth. The inhibition of noise reduction by luminance transitions through elements 50 and 57 is therefore eliminated for high chroma levels.

The signal passing through the switch 54 is inverted in logical sense by an analog inverter 56, the inverted output of which is then sent to the other input of the AND gate 44. The inverted logical output from the inverter 56 is at a logical low level during large horizontal transitions in the picture signal. The output of the AND gate 44 is consequently low during such transitions, unless the switch 54 is opened by the detection of chroma levels above a certain level, such as 40 IRE units.

An inverter including a non-linear amplifier 58 is connected from the chroma level line 36 to operate the switch 54. When the chroma level on the line 36 reaches a high chroma level, such as 40 IRE units, the inverter puts out a logical low signal which opens the switch 54. When chrominance levels are below the predetermined level, the switch 54 remains closed.

It has been determined that chroma noise disturbances are most visible when the overall luminance amplitude is low, i.e. the picture is dark, with many blacks and dark grays. In this situation it is desirable to perform chroma noise reduction irrespective of the other situations in which chroma noise reduction may be appropriate, as explained in conjunction with the first three paths.

Consequently, the fourth and fifth paths provide a black level detection and control function. The fourth path includes a black level low pass filter 60 which has a roll off at about 2 megahertz. The signal put out by the black level low pass filter is as follows: when the overall luminance value is e.g. at or below 10 IRE units, the logic level put out by the block 60 is zero. Between e.g. 10 and 20 IRE units, the output varies linearly with the IRE unit value. Above e.g. 20 IRE units, the the output value is at a logical one value.

An inverter 62 inverts the sense of this output signal, so that the inverter 62 puts out a logical one when the luminance value is at and below 10 IRE units, puts out a value which varies linearly between one and zero when the luminance level increases from 10 to 20 IRE units and puts out a zero whenever the luminance value is above 20 IRE units. The output of the inverter enters an electronic switch 64 which remains closed, except during the detection of any horizontal domain luminance transition whereupon it is opened for the duration of the transition.

The fifth and final path for video is through a horizontal transition band pass filter and detector circuit 70 which has a pass band of approximately 0.5 to 2.5 megahertz in the video base band. This circuit 70 detects each horizontal luminance transition and puts out a value for each horizontal transition. The sense of the output is made absolute by a full wave rectifier 72, and is then inverted by an inverter 74. The inverter 74 provides an output which is high or on, except during the luminance transition when it goes low, and opens the switch 64, preventing the signal from the black detection fourth path from passing, thereby enabling control of chroma noise reduction by the first, second and third path signals, during picture conditions where e.g. luminance gray levels are high only when a luminance transition is present.

The outputs from the switches 38 and 64 provide two inputs 76, 78, respectively, to a "larger input" gate 80. The larger input gate passes to an output 82 the larger signal present on each input. The signal on each input 76, 78 is a fractional value between zero and one. If the signal on the input 78 from the black level detection path is 0.7 and the signal on the input 76 from the chroma transition window paths one through three is a 0.4, then the gate 80 puts out a 0.7 value as the logic control pulse. This fractional value is multiplied in the multiplier 22 with the error value put out from the limiting amplifier 20 to provide the noise elimination pulse which is subtracted from the main path video signal in the second difference circuit 26.

The larger input gate circuit 80 may be implemented as is shown in FIG. 9, of U.S. patent application Ser. No. 06/349,017, now U.S. Pat. No. 4,504,853, which disclosure is incorporated herein by reference.

A summary of the operation of the wide bandwidth chroma noise reduction system of the present invention is as follows: when the chroma level is high, noise reduction occurs, except during luminance transitions. When the luminance signal is predominantly black, that is, less than e.g. 10 IRE units, chroma noise reduction occurs irrespective of chroma level, except during luminance transitions. In the event that the chrominance level is low, and the luminance is greater than e.g. 10 IRE units, then no chroma noise reduction occurs. If the conditions lie between these two limits, then chroma noise reduction occurs proportionally to the greater one of the two control values associated with chrominance or luminance.

While the apparatus and method of the present invention have been summarized and explained by an illustrative application in wideband chroma noise reduction by use of a logical control signal generated in response to actual picture conditions in accordance with predetermined criteria, it will be readily apparent to those skilled in the art that many widely varying embodiments and applications using analog and digital circuits and methods are within the teaching and scope of the present invention, and that the preferred embodiment presented herein is by way of example and illustration only and should not be construed as limiting the scope of the invention.

We claim:

1. A wide bandwidth chroma noise reduction system comprising:
    input means for receiving a quadrature modulated color television signal,
    wide bandwidth chrominance bandpass filter means connected to said input means for passing components of said television signal lying in the chrominance subcarrier pass band,
    narrow band chrominance enhancement and noise reduction means for processing chrominance signal components of said television signal so as to eliminate chroma component noise and put out an enhanced chroma signal component having a bandwidth apparently the same as the bandwidth of said components passing through said wide bandwidth bandpass filter means,
    a main signal path connected to said input means and including delay line means for time delay matching of said color television signal with signals passing through said wide bandwidth chrominance band pass filter means and through said narrow band chrominance enhancement and noise reduction means,
    control logic signal generator means connected to said input means for generating a fractional value logic control pulse in response to at least one predetermined signal condition sensed in said color television picture signal,
    first diffreence circuit means connected to subtract the outputs of said wide bandwidth chrominance enhancement and noise reduction means from each other and for putting out a resultant difference value,
    limiting amplifier means connected to said difference circuit means for limiting the resultant difference value to a predetermined limited value,
    four quadrant multiplier means for multiplying said predetermined limited value by said fractional value logic control pulse put out by said control logic signal generator means to provide a proportional noise reduction error signal having a magnitude lying between zero and said limited value,
    second difference circuit means connected to said main signal path for subtracting said proportional noise reduction error signal from said color television signal, and
    output means connected to said second difference circuit means for putting out a color television signal which has undergone wide band chroma noise reduction.

2. The wide bandwidth chroma noise reduction system set forth in claim 1 wherein said control logic signal generator means comprises chrominance signal component level detection means for detecting and puting out said logic control pulse in relation to the level of chroma signal component present in said color television signal.

3. The wide bandwidth chroma noise reduction system set forth in claim 1 wherein said control logic signal generator means comprises luminance signal component amplitude level detector means for putting out a signal as said logic control pulse whenever luminance signal component amplitude falls below a predetermined to enable maximum chroma noise reduction processing of said system.

4. The wide bandwidth chroma noise reduction system set forth in claim 3 wherein said luminance signal component amplitude level detector means puts out said logic control pulse whenever luminance signal component amplitude falls below about 10 IRE units.

5. The wide bandwidth chroma noise reduction system set forth in claim 3 further comprising luminance signal component transition detection means for detecting level transitions in said luminance signal component and switch means connected to said luminance signal component amplitude level detector means, said switch means for inhibiting said logic control pulse put out whenever a luminance signal component level transition is detected.

6. The wide bandwidth chroma noise reduction system set forth in claim 2 further comprising luminance signal component transition detector means for detecting transitions in said luminance signal component and first switch means connected to inhibit said logic control pulse put out by said chrominance signal component level detection means whenever a luminance signal component transition is detected by said luminance signal component transition detector means.

7. The wide bandwidth chroma noise reduction system set forth in claim 6 further comprising second switch means responsive to said chrominance signal component level detection means, said second switch means connected for inhibiting said luminance signal component transition detector means whenever chrominance signal component level is greater than a predetermined value.

8. The wide bandwidth chroma noise reduction system set forth in claim 7 wherein said second switch means inhibits said luminance signal component transition detector means whenever chrominance signal component level is greater than approximately 40 IRE units.

9. The wide bandwidth chroma noise reduction system set forth in claim 6 further comprising chrominance comb band pass filter means connected to said input for comb filter separating a chrominance signal component from said color television picture signal, and dual input AND gate means having an output connected to control operation of said first switch means, said chrominance comb band pass filter means connected to provide one input to said AND gate, said other input of said AND gate connected to receive an inverse value of said luminance signal component transition detector means so that said gate is enabled whenever a combed chroma signal component is detected to be present and said luminance signal component transitions detected by said detector are below a predetermined level.

10. The wide bandwidth chroma noise reduction system set forth in claim 9 further comprising second switch means responsive to said chrominance signal component level detection means, said second switch means connected for inhibiting said luminance signal component transition detector means whenever chrominance signal component level is greater than a predetermined value.

11. The wide bandwidth chroma noise reduction system set forth in claim 10 wherein said second switch means inhibits said luminance signal component transition detector means whenever chrominance signal component level is greater than approximately 40 IRE units.

12. The wide bandwidth chroma noise reduction system set forth in claim 10 wherein said control logic signal generator means further comprises luminance signal component amplitude level detector means for detecting the level of the luminance signal component and larger input gate means having inputs connected to said luminance signal component amplitude level detector means and to said chrominance signal component level detection means for putting out as said logic control pulse the greater one of the output of said luminance signal component amplitude level detector means whenever luminance signal component amplitude falls below a predetermined amount, and the output of said chrominance signal component level detection means.

13. The wide bandwidth chroma noise reduction system set forth in claim 12 wherein said luminance signal component amplitude level detector means is enabled whenever luminance signal component amplitude falls below about 10 IRE units.

14. The wide bandwidth chroma noise reduction system set forth in claim 12 further comprising luminance signal component transition detection means for detecting level transitions in said luminance signal component and third switch means connected to said luminance signal component transition detection means, said third switch means for inhibiting said logic control pulse put out whenever a luminance signal component level transition is detected.

15. A method for chroma noise reduction in a quadrature modulated color television signal path, said method comprising the steps of:
  detecting chroma signal component noise in said path,
  detecting predetermined signal characteristics in said path,
  generating a control signal as a function of said detected signal characteristics wherein said signal characteristics include at least one of: luminance component amplitude; luminance component level transition; and a combination of simultaneously occurring conditions in luminance and chrominance signal components in the path,
  applying said control signal to separate chroma signal component noise from the predetermined signal characteristics,
  subtracting said separated chroma noise in time coincidence with said color television signal in said path, whereby chroma noise is reduced from said signal path without bandwidth reduction.

16. A method for wide bandwidth chroma noise reduction of a quadrature modulated color television signal, said method comprising the steps of:
  band pass filtering of a quadrature modulated color television signal to put out a chrominance pass band component thereof,
  generating an enhanced chroma signal from said modulated picture signal with chroma noise reduction means and putting out said enhanced chroma signal,
  comparing said enhanced chroma signal with said chrominance pass band component to detect and put out any differences therein,
  amplitude limiting said differences to a predetermined error value not in excess of unity,
  generating a logic value with a logic system responsive to various picture conditions, so that in preselected ones of picture conditions the generated logic value will inhibit chroma noise reduction and in preselected others of picture conditions the generated logic value will enable chroma noise reduction fully or proportionally to the preselected condition,
  multiplying said error value by said logic value to produce an error signal having a value between zero and unity,
  subtracting said error signal in proper time from the color television picture signal thereby achieving a wide bandwidth chroma noise reduction therein.

17. A logic control system for generating control signals for controlling chroma signal processing equipment for processing a chroma component of a quadrature modulated color television picture signal, said logic control system comprising:
  input means for receiving said quadrature modulated color television picture signal;
  chroma level detection means connected to said input means for detecting the presence of a chroma component in said color television picture signal, and for putting out a first control value whenever chroma level is above a predetermined minimum chrominance level,
  black level detection means connected to said input means for detecting that luminance level is below a predetermined minimum luminance level and for putting out a second control value whenever luminance is below said minimum luminance level,
  gate means connected to said chroma signal processing equipment for receiving said first control value and for receiving said second control value in order to control operation of said chroma signal processing equipment.

18. The logic control system set forth in claim 17 wherein said gate means comprises larger input gate means having one input connected to receive said first control value and having a second input connected to receive said second control value, and for putting out as a control signal to control said chroma signal processing equipment the larger one of said two input values.

19. The logic control system set forth in claim 17 further comprising black level inhibit means for inhibiting said second control value during horizontal transitions detected by said inhibit means in a luminance component of said color television picture signal.

20. The logic control system set forth in claim 17 further comprising chroma level detection inhibit means for inibiting said first control value whenever chroma is not present in said color television picture signal above a minimum chroma level, and whenever a luminance horizontal transition component is present in said color television picture signal.

21. The logic control system set forth in claim 20 further comprising override means responsive to said chroma level detection means and being connected for overriding said chroma level detection inhibit means whenever chroma is present in said color television picture signal above a predetermined chrominance value.

* * * * *

UNITED STATES PATENT AND TRADEMARK OFFICE
CERTIFICATE OF CORRECTION

PATENT NO. : 4,672,429
DATED : June 9, 1987
INVENTOR(S) : FAROUDJA et al.

Page 1 of 2

It is certified that error appears in the above-identified patent and that said Letters Patent is hereby corrected as shown below:

In the drawings, Sheet 1, Fig. 1 should be replaced with the correct drawing shown below. This correction should also appear on the title page.

UNITED STATES PATENT AND TRADEMARK OFFICE
CERTIFICATE OF CORRECTION

PATENT NO. : 4,672,429

DATED : June 9, 1987

INVENTOR(S) : FAROUDJA ET AL

It is certified that error appears in the above-identified patent and that said Letters Patent is hereby corrected as shown below:

Column 1, line 29, "385" should read -- 383 --.

Signed and Sealed this

Ninth Day of May, 1989

Attest:

DONALD J. QUIGG

*Attesting Officer*  *Commissioner of Patents and Trademarks*